United States Patent [19]

Witte et al.

[11] 4,048,586
[45] Sept. 13, 1977

[54] CHEMICAL LASER WITH MIXING ENHANCEMENT DEVICE FOR POWER IMPROVEMENT

[75] Inventors: Arvel B. Witte, Rolling Hills; James E. Broadwell, Palos Verdes Estates; Dale L. Hook, Rancho Palos Verdes, all of Calif.

[73] Assignee: TRW Inc., Redondo Beach, Calif.

[21] Appl. No.: 648,694

[22] Filed: Jan. 12, 1976

[51] Int. Cl.² ........................ H01S 3/02; H01S 3/095; H01S 3/22
[52] U.S. Cl. ........................ 331/94.5 D; 331/94.5 P; 331/94.5 G; 330/4.3
[58] Field of Search .................... 331/94.5; 330/4.3

[56] References Cited

U.S. PATENT DOCUMENTS

| 3,688,215 | 8/1972 | Spencer et al. | 331/94.5 G |
|---|---|---|---|
| 3,701,045 | 10/1972 | Bronfin et al. | 331/94.5 G |
| 3,832,650 | 8/1974 | Roberts | 331/94.5 G |

Primary Examiner—Robert J. Webster
Attorney, Agent, or Firm—John J. Connors; Donald R. Nyhagen; Edwin A. Oser

[57] ABSTRACT

An inert diluent such as $N_2$, He, Ar, etc., is injected into the reactant streams emerging from the cavity nozzle of a CW, supersonic, laser to increase the cavity power and lower the cavity temperature by enhancing mixing of the reactant stream while maintaining high pressure recovery.

8 Claims, 10 Drawing Figures

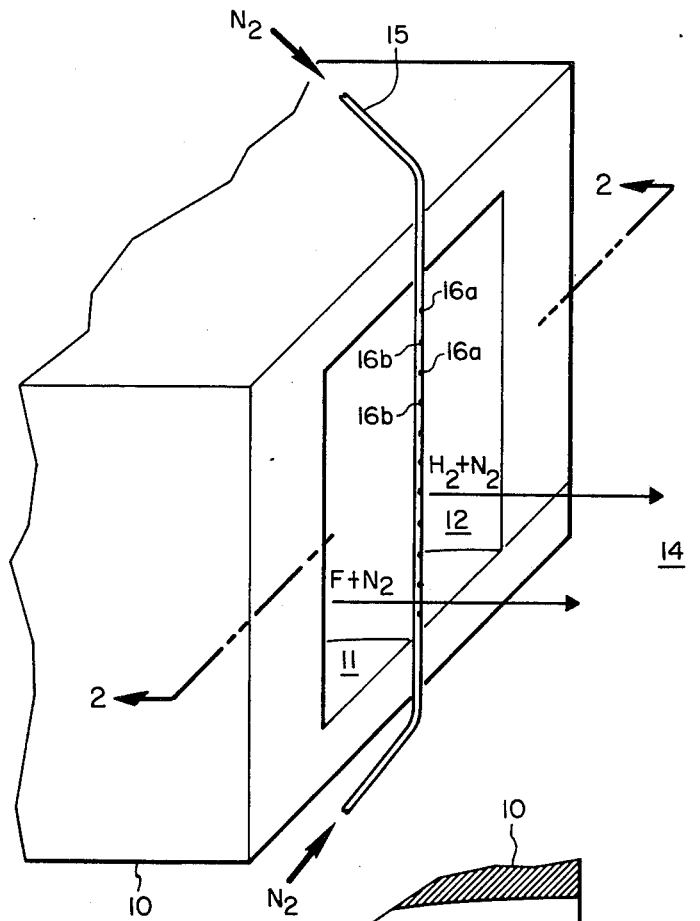
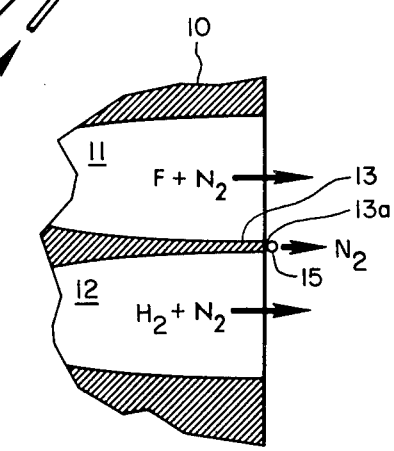

CHEMICAL LASER WITH MIXING ENHANCEMENT DEVICE FOR POWER IMPROVEMENT

The invention herein described was made in the course of or under contract or subcontract thereto, with the Department of the Air Force.

BACKGROUND OF THE INVENTION

This invention relates to a new and improved HF/DF, CW supersonic chemical laser. More specifically, the invention concerns an improved cavity nozzle for such a laser embodying trip fluid injection means for improving the mixing of fuels in the laser cavity thereby improving output efficiency.

In the technology of supersonic HF/DF CW chemical lasers, interest is being focussed on the nature and improvement of the mixing mechanism in the laser cavity. One apparatus for injecting reactants into laser cavity is described in the paper "Initial Performance of a CW Chemical Laser" by D. J. Spencer, H. Mirels, and T. A. Jacobs, published in OptoElectronics 2(1970), pgs. 155-160. Spencer et al provides a plurality of parallel nozzles for injecting atomic fluorine (i.e., fluorine nozzles) and an inert diluent such as He, Ar, $N_2$, etc., at supersonic speeds into the laser cavity. Molecular hydrogen (or deuterium) fuel is injected separately into the cavity through perforated tubes which are located between the fluorine nozzles and reacts with the atomic fluorine to produce HF* or DF* as follows:

The flow of reactants (F and $H_2$) into the cavity occurs as laminar mixing layers and the formation of either HF* or DF* takes place along the interface of these layers. Under these conditions, the interface between the flow lines does not grow with sufficient rapidity to provide maximum efficiency for such a device.

It is, therefore, an object of this invention to provide a process and apparatus which will cause the cavity interface (i.e. the mixing layers to grow rapidly and conform to the cavity geometry without excessive optical cavity disturbance or mixing loss.

Another object is to provide a process for reducing the cavity reaction temperature.

Another object is to provide a significant increase in power output from an HF/DF, CW supersonic chemical laser.

THE INVENTION

According to the invention, there is provided an improved cavity nozzle for an HF/DF, supersonic, CW chemical laser having a. a combustor for producing atomic fluorine;
b. a laser cavity for reacting $H_2$ or $D_2$ with the atomic fluorine to produce the corresponding laser species;

the cavity nozzle of the invention has a plurality of linear, parallel, longitudinal nozzle passages for injecting into the cavity, at supersonic speed,
 i. mixtures of F with diluent; and
 ii. $H_2/D_2$ with diluents, each pair of adjacent nozzle passages are separated by a wall which tapers to a narrow trailing edge at the exit end of the passages. Along each such trailing wall edge is a trip bar means comprising a plurality of trip fluid injection orifices for injecting additional diluent laterally into the reactant streams emerging from the nozzle passages to enhance mixing of the reactant streams, and thereby the lasing operation.

The enhanced mixing achieved by injecting additional diluent into the reactant streams using the trip bar produces gains of typically 60%, and increases in excited species of two to three times are achieved. Furthermore, this is accomplished with minimal degradation of pressure recovery.

In operation, combustor temperatures will vary from about 1400° K to 1600° K and preferably 1500° K. Combustor pressures will vary from about 50 psi to 250 psi. Cavity temperatures will vary from about 250° K to 700° K and cavity pressures will vary from about 5 torr to 15 torr. Reactant flow rates will vary depending on the size of the laser.

IN THE DRAWINGS

FIG. 1 is a perspective view of the nozzle assembly embodying the trip bar means of this invention;

FIG. 2 is a plan schematic view of an axial section of the nozzle showing the trip bar means taken along a line 2—2 of FIG. 1;

Figure 3:
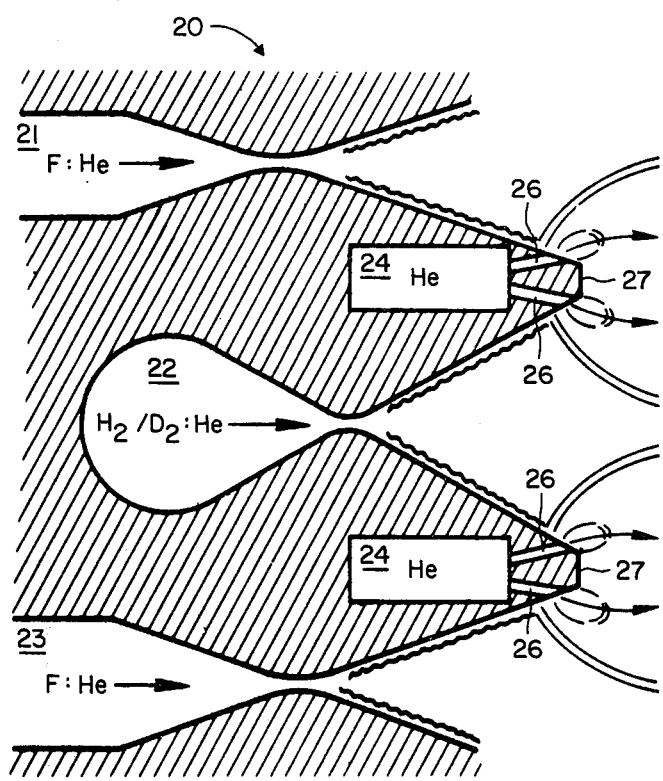
FIG. 3 is a view in axial section of another embodiment of a trip bar incorporated into a nozzle assembly.

A typical example of CW chemical laser which may employ the trip bar is shown in U.S. Pat. No. 3,863,176 to John S. Martinz et al.

In the drawings, FIGS. 1 and 2 show a portion of a reactive flow test cavity nozzle 10 having a body provided with vertical slit orifices or nozzle passages, two of which are designated 11, and 12.

As shown in FIG. 2, to initially demonstrate the feasibility of the trip concept to produce faster mixing, the nozzle 10 of FIGS. 1 and 2 is shown about 10 times the size of an actual chemical laser. This larger size provides better resolution and analysis of the measured mixing layer properties which subsequently can be incorporated into a laser. Nozzle passage 11 provides one reactive ingredient such as atomic fluorine and a diluent such as $N_2$ from a combustor, not shown. Nozzle passage 12 provides the other reactive ingredient such as $H_2$ or $D_2$ also with a diluent if desired. A wall tapered 13 is provided to separate the nozzle passages and define a trailing edge or land portion 13a at the entrance to a cavity 14. In this embodiment, the trip fluid injection means of the invention comprises a hollow tube 15 positioned along the trailing edge 13 a. A plurality of equally spaced trip fluid injection orifices or holes 16a, 16b, along tube 15, are directed in alternate sequence into the reactant streams leaving nozzle passages 11 and 12. Tube 15 thus supplies an inert gas such as $N_2$ to the reactants as they leave the nozzles 11, 12 and mix in the cavity 14. The $N_2$ injection from the trip bar functions to produce turbulent-like fast mixing of the reactants by introducing three-dimensional disturbances in the flow-mixing layer. This process also provides some cooling of the reaction zone within the mixing layer.

Figure 6:
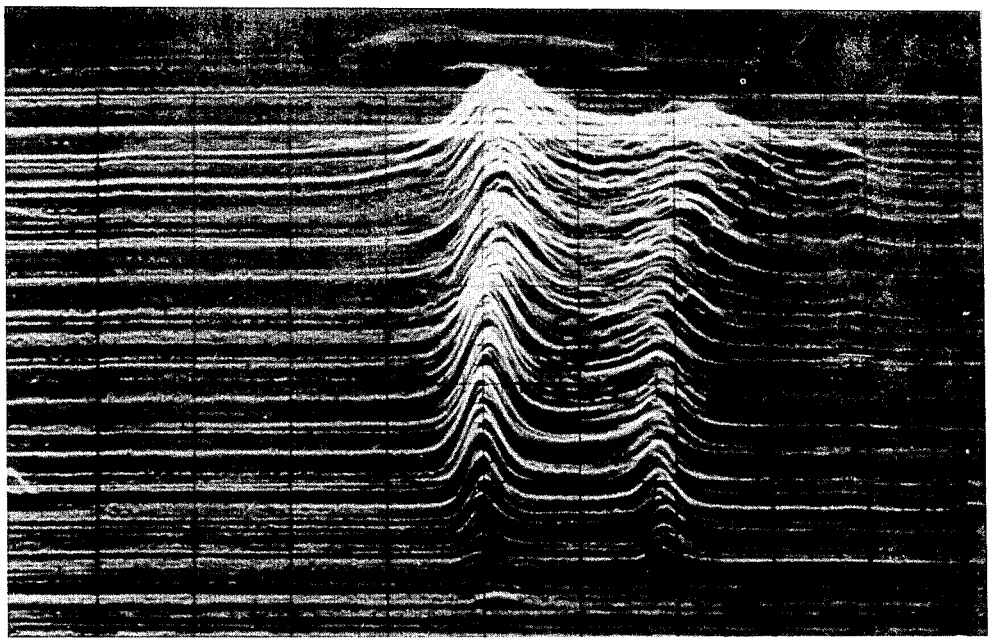
FIGS. 6 and 7 are I.R. scanner records showing combustion enhancement without and with trip flow in a reactive flow apparatus.
Figure 7:
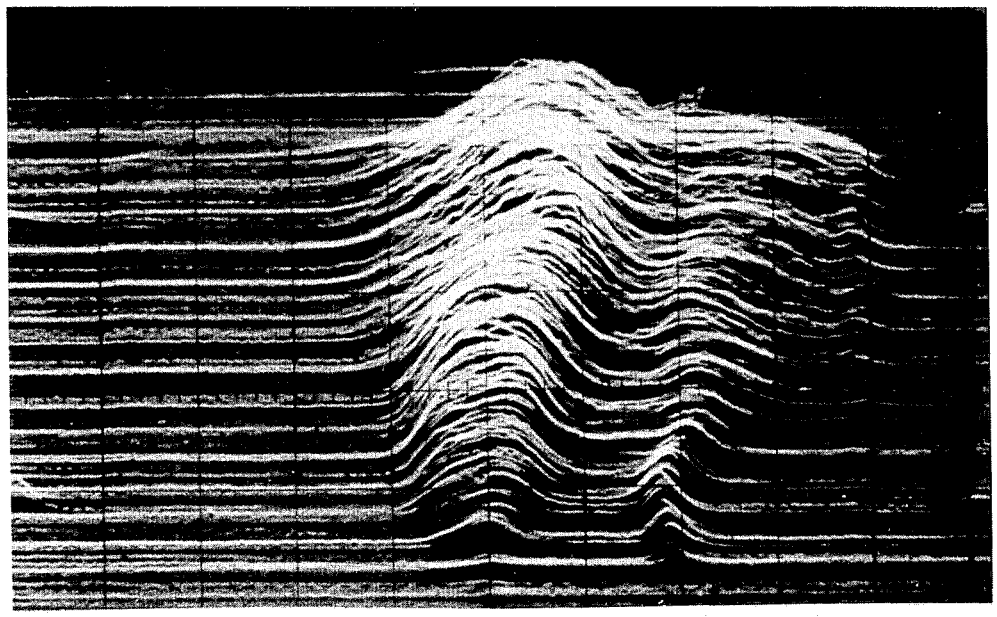

The present invention artificially speeds up the mixing between streams to produce a fast turbulent-like mixing and effect more complete combustion. The degree of enhancement of mixing and of excited-state species production by the device is shown in FIGS. 6 and 7 without and with trip flow injection. The data were obtained with an I.R. scanning instrument which provides a two-dimensional mapping of vibrationally-excited molecular concentrations (HF*). The injection flow-rate was no more than about 2 percent of the main stream flow. The length scales for the flow direction, into the cavity (oriented vertically), and the transverse direction (oriented horizontally), are shown by dimensions between calibration pinlite "blips", one of which is shown at the left-hand side in each of FIGS. 6 and 7. The HF* signal from the mixing layer between the $H_2$ and F nozzles starts at the nozzle exit plane. The signal intensity is given by the vertical displacement of the traces. Because of a recirculation pattern, some $H_2$—F combustion occurs on the outside or free shear layer side of the F stream shown as the smaller mixing zone on the right-hand side of FIGS. 6 and 7.

With the fluid injection turned on (FIG. 7), the mixing-reaction zone is observed to increase by about a factor of two without a noticeable change in peak signal compared to FIG. 6 (no injection). Faster, turbulent-like mixing is caused by injection of the small fluid sprays.

Figure 8:
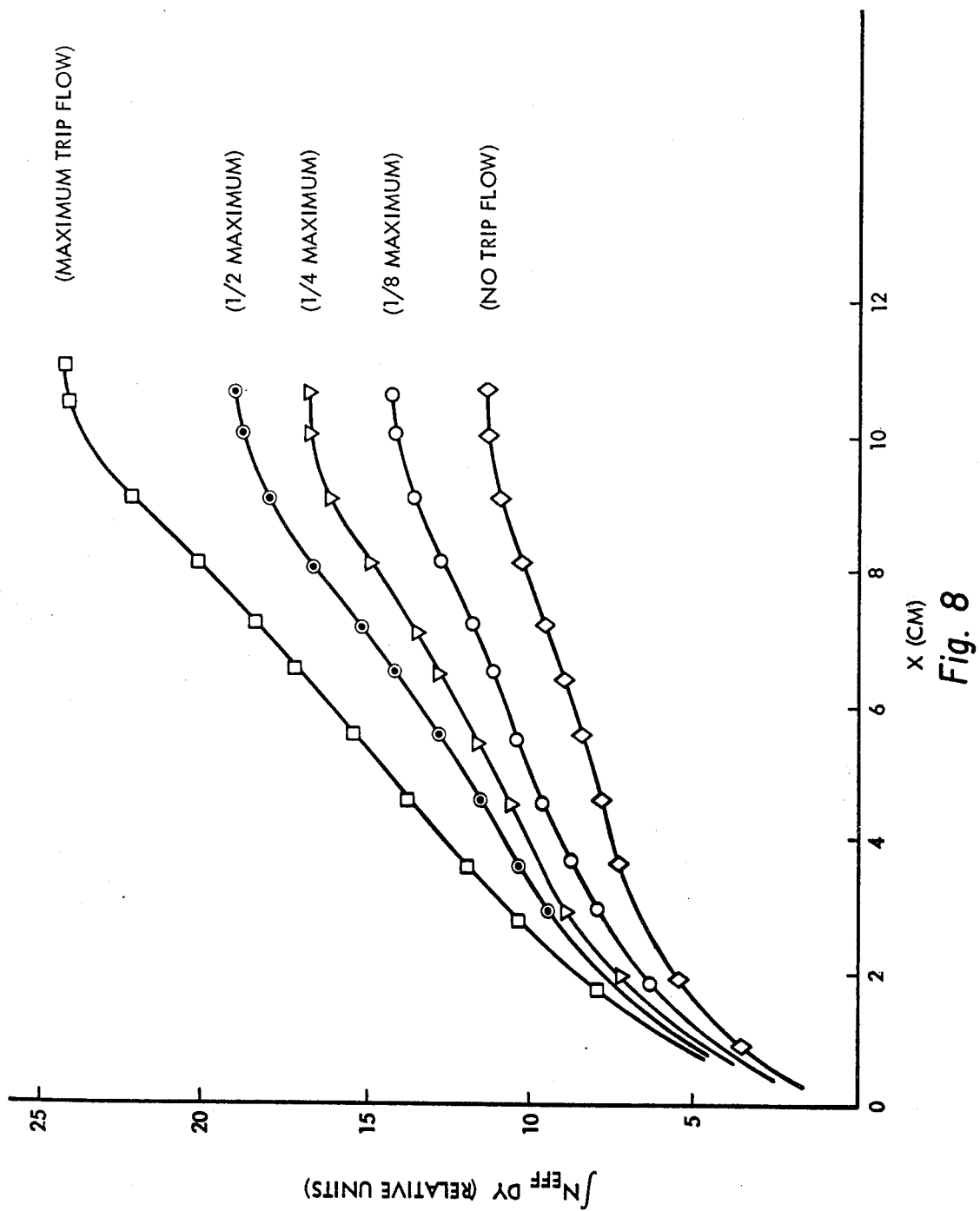
FIG. 8 is a graph showing the effect on radiance for various trip flow conditions.

When the number-density profiles are integrated and plotted as a function of downstream distance X, a measure of enhancement (increased HF* concentration) can be made by comparing the results to the no-injection case. This is shown in FIG. 8, where it is observed that enhancement increases monotonically. The maximum enhancement achieved with this device is observed to be a factor of about 2.5 for HF combustion at X = 10 cm downstream from the nozzle exit plane.

Figure 9:
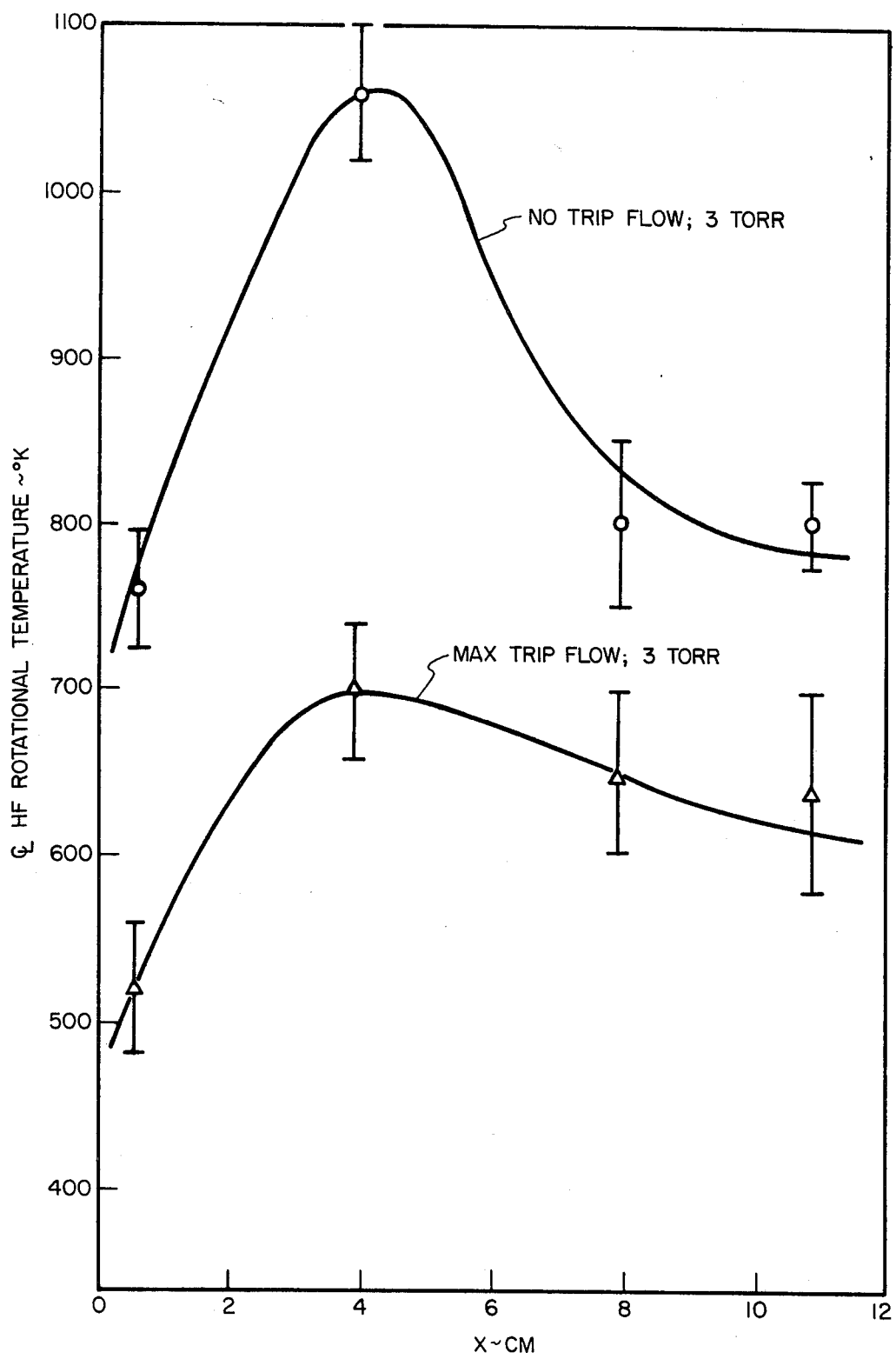
FIG. 9 is a graph showing the temperature reduction in a reactive flow apparatus using trip flow compared to non-tripped flow conditions.

A temperature reduction also occurs when employing trip flow conditions as shown in FIG. 9 where it will be observed that temperature reductions of 100° – 400° K were achieved by no-trip and trip flow conditions.

An embodiment of the present trip fluid injection means suitable for a chemical laser is shown in FIG. 3. This comprises a cavity nozzle 20 provided with nozzle passages or channels 21, 22 and 23 for supplying in alternate sequence, F from the combustor and $H_2$ or $D_2$ to the laser cavity. Channels 21, 23 supply a mixture of F and diluent such as He, $N_2$, Ar, etc., while channel 22 supplies, from a separate source, $H_2$ or $D_2$ and a diluent to the cavity. Trip manifolds 24 supply feed ducts 26 to both sides of each trailing edge 27 in alternate sequence, and inject the diluent into the cavity in the direction shown by the arrows to enhance the mixing. If desired, channel 22 feeding $H_2/D_2$ to the cavity may be connected to trip manifold 24 to improve the uniformity of the trip supply. About 1 percent of the total actual flow through channel 22 is threby tapped to the trip manifold 24. This eliminates the requirement of an independent feed supply for the trip manifold.

Figures 4, 4A:
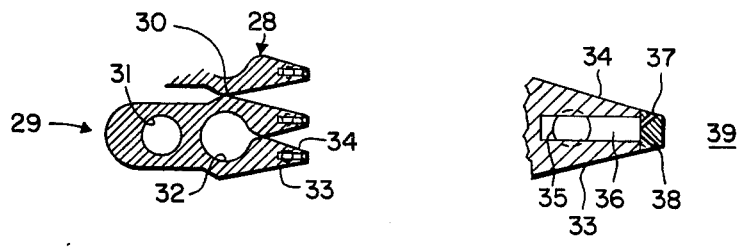
FIGS. 4 and 4a are plan views in axial section of another embodiment of a trip bar incorporated into a nozzle assembly, FIG. 4a being an enlargement of a portion of FIG. 4.

FIG. 4 shows nozzles 28, 29 of an array which was actually employed on a chemical laser. The nozzles 28, 29 are separated by a space 30 through which is fed atomic fluorine and a diluent (He, $N_2$, etc.) from the combustor. The nozzles provide a passageway 31 for a coolant such as water and a manifold 32 which injects a diluent (He) and deuterium into the cavity. One trip bar is shown in enlarged detail in FIG. 4a in which the trailing edges 33 and 34 define a trip manifold 35 and a channel 36 which connects to orifices 37, 38 leading into the cavity 39. In effect, the trip bar is an integral part of the land region. Helium or other inert gases are fed into the supply port and are injected into the cavity through the orifices 37, 38.

Figure 5:
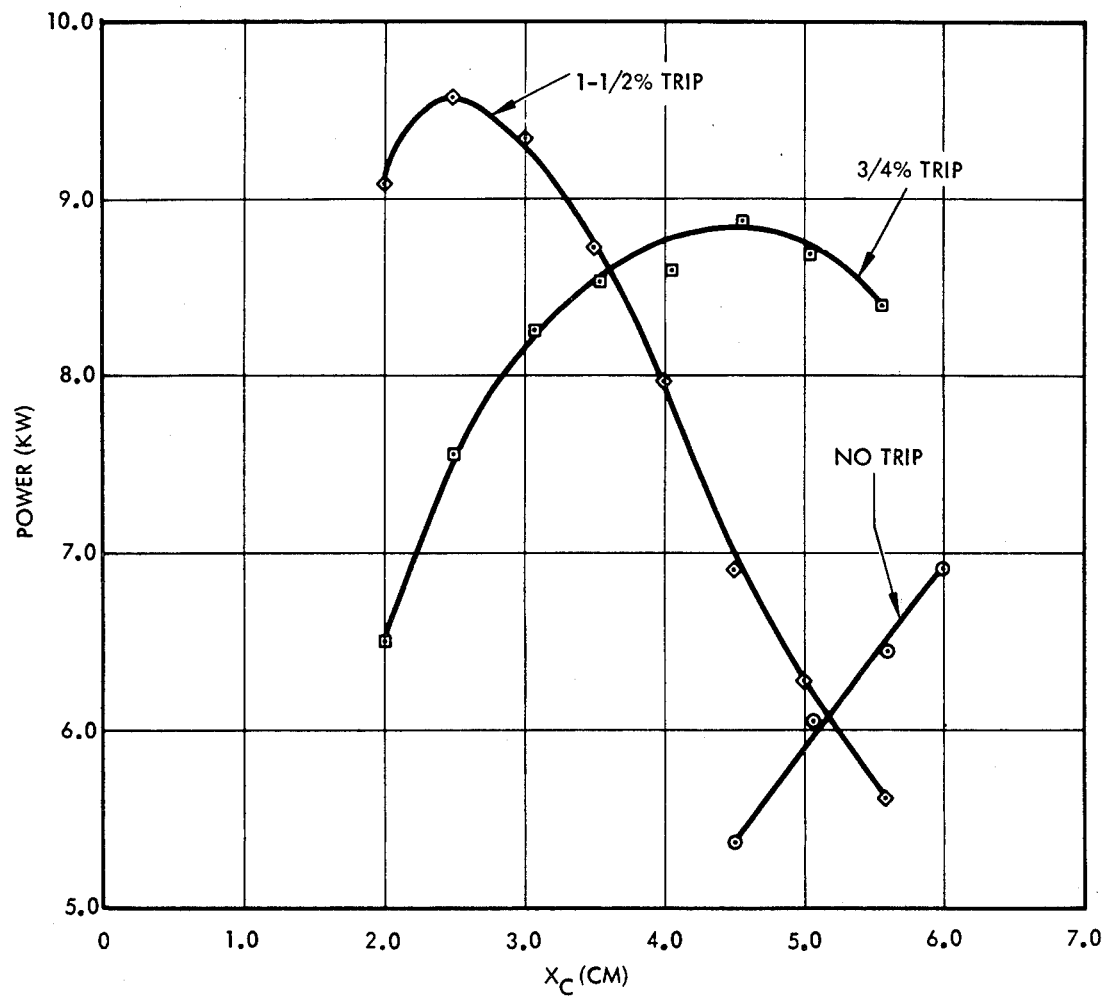
FIG. 5 is a graph showing the effect of using the trip bar compared to its omission, when measuring output power downstream from the nozzle exit at the cavity.

The change in power output when employing the trip bar of this invention compared to no-trip-flow is shown in FIG. 5. It is obvious that trip flow markedly increases the output power compared to the no-trip-flow.

The trip flow device of the present invention thus provides a simple method of achieving significant power output from a chemical laser with only a minor increase of fluid injection while still maintaining pressure recovery and also lowering the cavity temperature.

Finally, the trip flow device is mechanically simple and does not have any moving parts.

We claim:

1. A cavity nozzle for a supersonic CW chemical laser fueled by the reactants (a) atomic fluorine and (b) $H_2$ $D_2$ and having a lasing cavity in which said reactants (a) and (b) react, comprising:

a nozzle body having parallel linear nozzle passages with each pair of adjacent passages separated by a wall tapering to a narrow trailing edge at the exit ends of said passages for injecting parallel contiguous streams of said reactants (a) and (b) from said passages, respectively, into said cavity along parallel linear paths at supersonic velocity in a manner such that each pair of contiquous streams of said reactants (a) and (b) have an intervening common mixing region; and trip means comprising a plurality of trip fluid injection orifices spaced along each trailing wall immediately adjacent the edge between reactant nozzles with certain of the orifices opening toward one adjacent reactant stream path and the remaining orifices opening toward the other adjacent reactant stream path for injecting inert diluent fluid streams laterally into the respective reactant streams as the latter issue from their nozzle passages to induce turbulent-like fast mixing of the contiguous reactant streams within their respective boundary region.

2. A supersonic chemical laser cavity nozzle according to claim 1 wherein said trip fluid injection orifices along each wall trailing edge open toward the respective adjacent reactant stream paths in alternate sequence.

3. A supersonic chemical laser cavity nozzle according to claim 1 wherein said trip means comprises a trip tube extending along and secured to each trailing wall edge and containing the respective trip fluid injection orifices.

4. A supersonic chemical laser cavity nozzle according to claim 3 wherein said trip fluid injection orifices along each wall trailing edge open toward the respective adjacent reactant stream paths in alternate sequence.

5. A supersonic chemical laser cavity nozzle according to claim 1 wherein each nozzle all has convergent sides bounding the adjacent nozzle passages, respectively; and said trip means comprises a trip fluid passage extending through each wall between its sides and lengthwise of its trailing edge, and communicating with the respective trip fluid injection orifices, and said trip orifices in each wall open through said wall sides.

6. A supersonic chemical laser cavity nozzle according to claim 5 wherein said trip fluid injection orifices along each wall trailing edge open toward the respective adjacent reactant stream paths in alternate sequence.

7. The method of mixing the reactants (a) atomic fluorine and (b) $H_2$ or $D_2$ in a supersonic CW chemical laser having a lasing cavity in which said reactants (a) and (b) react comprising the steps of injecting contiguous parallel streams of said reactants (a) and (b) into said lasing cavity at supersonic velocity through parallel linear nozzle passages of a nozzle having a wall separating each pair of adjacent passages and tapering to a narrow trailing edge at the exit ends of said passages in a manner such that each pair of contiguous streams of said reactants (a) and (b) have an intervening common mixing region; and injecting trip fluid streams of an inert diluent fluid through trip fluid injection orifices spaced along each trailing wall immediately adjacent the edge of said nozzle laterally into the adjacent contiguous reactant streams as the latter issue from their nozzle passages to induce turbulent-like fast mixing of the contiguous streams within the mixing region of the respective contiguous streams.

8. The mixing method of claim 7 wherein said trip fluid injection orifices along each nozzle wall trailing edge open toward the adjacent contiguous reactant streams in alternate sequence.

* * * * *

UNITED STATES PATENT AND TRADEMARK OFFICE
CERTIFICATE OF CORRECTION

PATENT NO. : 4,048,586
DATED : September 13, 1977
INVENTOR(S) : Arvel B. Witte et al It is certified that error appears in the above-identified patent and that said Letters Patent are hereby corrected as shown below:

In the ABSTRACT, line 5, change "stream" to --streams--

Column 1, line 19, after "into" insert --a--

Column 1, line 65, change "end" to --ends--

Column 2, line 58, change "wall tapered" to --tapered wall--

Column 2, line 68, before "11" insert --passages--

Column 3, line 24, change "$H_2$-F" to --$H_2$ -F--

Column 3, line 59, after "$H_2/D_2$" insert --and He--

Column 4, line 64, change "all" to --wall--

Signed and Sealed this

Fourteenth Day of March 1978

[SEAL]

Attest:

RUTH C. MASON
Attesting Officer

LUTRELLE F. PARKER
Acting Commissioner of Patents and Trademarks